United States Patent

[11] 3,624,547

| [72] | Inventor | Cortland O. Dugger<br>Fayerweather St., Cambridge, Mass. 02138 |
| --- | --- | --- |
| [21] | Appl. No. | 796,413 |
| [22] | Filed | Feb. 4, 1969 |
| [45] | Patented | Nov. 30, 1971 |

[54] SOLID-STATE LASER PRODUCED BY A CHEMICAL REACTION BETWEEN A GERMINATE AND AN OXIDE DOPANT
10 Claims, 1 Drawing Fig.

| [52] | U.S. Cl. | 331/94.5, |
| --- | --- | --- |
| | | 23/16, 136/239, 252/301.4, 321/69 |
| [51] | Int. Cl. | H01s 3/16 |
| [50] | Field of Search | 331/94.5; |
| | | 252/301.4 |

[56] References Cited
OTHER REFERENCES

Koelmans et al.: " The Fluorescence of Binary and Ternary Germinates of Group II Elements," Journal of the Electrochemical Society, vol. 106, pp. 677– 682

*Primary Examiner*—Ronald L. Wibert
*Assistant Examiner*—Edward S. Bauer
*Attorney*—Morse, Altman & Oates ABSTRACT: A system of germinates is provided which can be synthesized as single crystals, glasses or polycrystalline (powder) substances. New germinate compositions are disclosed as well as new processes for producing germinates. Luminescence observed in the germinates is believed to be caused by dopants or by self-activation. The germinates are employed as lasers, electronic semiconductive devices, thermoelectric devices and other applications.

PATENTED NOV 30 1971 3,624,547

INVENTOR.
CORTLAND O. DUGGER
BY
Moro, Altman & Oates

ATTORNEYS 3,624,547

SOLID-STATE LASER PRODUCED BY A CHEMICAL REACTION BETWEEN A GERMINATE AND AN OXIDE DOPANT

BACKGROUND OF THE INVENTION

1. Field of the Invention

This invention relates generally to germanate compositions and their applications and more particularly is directed towards a selected family of germanate compositions having unusual properties.

2. Background of the Invention

Germanium is commonly used in semiconductive devices, the germanium crystal serving as a matrix doped with one or more selected impurities to achieve certain functional characteristics. However, relatively little attention has been given to germanium oxide compositions and their applications and it is an object of the present invention to provide a family of germanates having unusual physical characteristics and adapted for a variety of uses including optical applications involving a new type of laser, electronic applications such as semiconductors and other uses.

SUMMARY OF THE INVENTION

This invention features compositions for forming solid-state articles wherein the starting mixtures are comprised of germanium oxide and at least one substance of a class which, when chemically combined with the germanium oxide, produces an ionically imbalanced germanate having a defective crystalline structure displaying many useful characteristics and suitable for a variety of applications.

This invention includes germanate compositions comprised of lithium germanate, zinc germanate and sodium germanate doped with transition oxide dopants and/or rare earth oxides and/or self-activation which render the germanates luminescent. This invention also features, among other applications of the germanates, a laser in which the laser material is a luminescent germanate in which its internal luminescence is employed as its own laser-pumping source. New processes for producing germanates are also featured by this invention.

DESCRIPTION OF THE PREFERRED EMBODIMENTS

Figure 2:
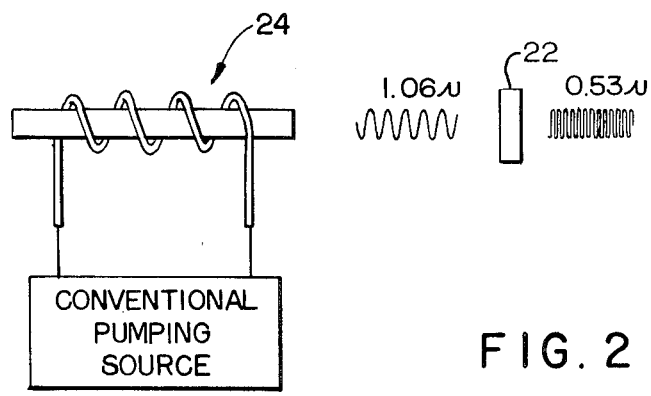
FIG. 2 is another somewhat schematic diagram showing a germanate crystal made according to the invention.

This invention relates to a family or system of germanates, to compositions and processes for making germanates and to applications of the germanates. The germanates may be synthesized as single crystals, glasses or polycrystalline substances. In general, the compositions of this invention are suitable for forming solid-state articles wherein the starting mixtures are comprised of germanium oxide and at least one substance of a class, which when chemically combined with the germanium oxide, produces an ionically imbalanced germanate having a defective crystalline structure.

A germanate system, as employed herein, is defined as including any one of the following chemical compound categories within the temperature range of 4.2° K. to 2273° K.: (1) germanium dioxide ($GeO_2$), (2) germanium monoxide (GeO), (3) the chemical combination of $GeO_2$ and GeO, (4) the chemical combination of elemental germanium (Ge) with one or more inorganic oxides, (5) the chemical combination of germanium dioxide and/or germanium monoxide with one or more inorganic oxides and/or inorganic metals and/or inorganic nonmetals. Germanate compounds of the latter category are selected from the group consisting of lithium germanate, zinc germanate and sodium germanate and possess properties which include fluorescence, phosphorescence, thermoluminescence, cathodoluminescence, i.e. X-rays and/or gamma rays and electroluminescence.

Open structures, polymorphism and structural imperfections are also characteristic properties of the germanates. These properties are described in terms of lithium septagermanate ($Li_2Ge_7O_{15}$).

1. There is chemical, X-ray and electrical evidence that open structures are present in $Li_2Ge_7O_{15}$ single crystals. Although a structural analysis of the compound is in progress, incremental neodymium (Nd) doping in $Li_2Ge_7O_{15}$ single crystals was performed. Neutron activation analysis detected up to 2.5 weight-percent Nd (2.9 weight-percent $Nd_2O_3$) in $Li_2Ge_7O$ crystals. The lattice constants are the same for both 2.5 weight-percent Nd and undoped $Li_2Ge_7O_{15}$ single crystals. The ionic radii of $Li^{+1}$, $Ge^{+4}$, and $Nd^{+3}$ are ca. 0.60 A., 0.53 A., and 1.04 A., respectively. No intentional charge compensation for the neodymium ($Nd^{+3}$) ions was provided in order to maintain electrical neutrality of the lattice.

A crystalline germanate, then, is considered to possess an open structure if the following requirements are met: (1) if solute cation(s) and/or atom(s) and/or molecule(s) can chemically combine with a given crystalline germanate; (2) if the relative size of the solute cation(s) (ionic radius) can be greater than 15 percent the relative size of the largest cation of the given crystalline germanate; (3) if the crystalline lattice constants remain essentially the same (not greater than 10 percent) as before adding the solute cation(s).

Other criteria, such as electrical measurements, ion implantation, and X-ray structural analysis, can be used to verify the open structure(s).

In the event the largest cation(s) of a crystalline germanate is so large that the size of the solute cation(s) does not exceed 15 percent, then the other criteria mentioned above should be considered to determine the crystalline open structure(s).

The crystalline open structure(s) permit multiple doping in the germanates.

Glasses, of course, are known to possess open structures.

2. Polymorphism is considered to be the transformation (change) of a given germanate from one crystalline structure or structural coordination to a different crystalline structure of structural coordination.

The germanates possess many polymorphic forms. The following experimental evidence indicates polymorphism in germanates by differential thermal analysis (DTA).

Figure 4:
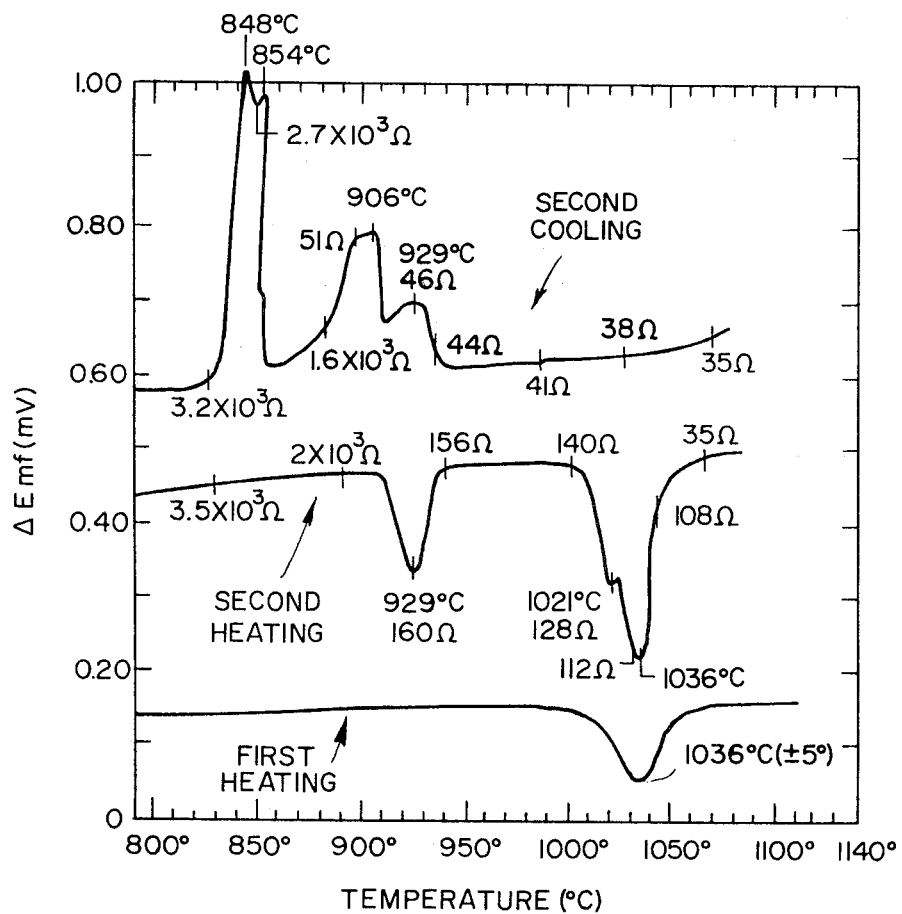

Three different $Li_2Ge_7O_{15}$ X-rayed single crystals were separately pulverized to −80 mesh. DTA was performed on three different powdered samples (180 mg.) of each crystal. Five heating and cooling cycles were made for each powder. A plot of the statistical average of the 45 thermograms, where phase transitions occur within the 800° C. to 1140° C. temperature range is shown in FIG. 4.

During the first heating of each sample, the only endothermic transition occurs at 1035±5° C. (mp). During the second heating and all subsequent heatings, endothermic reactions occur at 929° C., 1021° C. and 1036±5° C. Occasionally, transitions occur at 917° C. and 943° C.

More than a 100° C. undercooling of the melt occurs when $Li_2Ge_7Ois$ cooled 8° C. per minute.

Infrequently, transitions occur at 917° C. and 943° C.

A Wheatstone bridge was used to measure the changes of the electrical resistance of the sample as a function of temperature. The mark changes in the electrical values confirm the DTA recorded transitions. The very reproducible electrical values are not necessarily the correct electrical resistances because $Li_2Ge_7O_{15}$ is thermoelectric.

The DTA heating and cooling rates were 12° C. and 8° C. per minute, respectively. The reference temperature and reference material were zero degrees centigrade (0° C.) and alpha aluminum oxide ($\alpha Al_2O_3$), respectively. All thermal analyses were made in air at atmospheric pressure. The 0-to-1-millivolt span as shown on the ordinate of the DTA thermogram (FIG. 4) represents a 0-to-400-microvolt input signal to the Y-axis preamplifier.

Polymorphic changes occur upon heating at approximately 917° C., 929° C., 943° C., and 1021° C. Upon cooling, these changes occur at approximately 943° C., 929° C., 917° C., 906° C., and 848° C. These phase transitions represent polymorphs and not decomposition products.

3. The structural imperfections in the germanates are deviations from an ideal structure. These imperfections are categorized as electronic-structured and atomic-structured defects. Electronic-structured defects are considered as imperfections in the electronic energy levels of the germanates; i.e., electrons and/or atoms and/or ions being excited into higher energy levels thereby producing vacant positions in the normally filled electronic energy bands.

Atomic structured defects include imperfections, such as solid solutions, Frenkel and Schottky disorders, order-disorder transformations, nonstoichiometric solids, dislocations, and surface and interface imperfections.

In accordance with the invention the concentration range for the germanates is one in which the starting mixture concentration ratio limits of oxygen atoms and/or ions to germanium atoms and/or ions, is from 1.5:1 through 3.0:1; that is, 1.5:1≤0: Ge≤3.0:1. These limits are applicable to binary or multiconstituent starting mixtures in which germanium oxide (mono or dioxide) is one of the starting constituents or elemental germanium and at least one inorganic oxide are starting mixture constituents. A few examples which demonstrate the 0:Ge starting mixture concentration ratios are as follows:

Binary Oxide Starting Mixtures
(a) $Li_2Ge_2O_5$    0:ge=1.5:1    because $30/2G_a=1.5$
(b) $Na_2GeO_3$    0:Ge=2.0:1
(c) $Li_2Ge_7O_{15}$    $0:G_e=2.1;1$
(d) $ZnGe_4O_9$    $0;G_a=2.3;1$
(e) $Zn_2Ge_5O_x$    $0:G_a=2.7;1$
(f) $Na_2GeO_3$    $0:G_a=3.0:1$ Other binary mixtures include $Li_2Ge_4O_9$, $Li_4Ge_9O_{20}$, $Li_2GeO_3$, $Na_4Ge_9O$, and $ZnGe_7O_{15}$.

MultiConstituent Starting Mixtures
(a) $Li_2Al_{0.67}Ge_7O_{16}$    0:Ge=2.3:1
(b) $Na_2Al_2Ge_4O_{12}$    0:Ge=30:1
(c) $SrCoZn_2Ge_4O_{12}$    0:Ge=30:1

The starting mixture concentration ratio limits permit oxides other than lithium oxide and/or zinc oxide and/or sodium oxide and/or germanium oxide (mono and/or dioxide) to be added to the starting mixture. Compositions of halides and/or sulfides and/or nitrides and/or borides and/or carbides may also be added to the starting mixture. As employed herein, starting mixture is defined as the preparation resulting from the mechanical mixing of appropriate quantities of the desired constituents, e.g. lithium oxide and germanium dioxide.

In accordance with the invention the luminescent germanates in the concentration range specified above result from the chemical combination (doping) of the germanates with transition oxide and/or metals, rare earth oxides and/or metals. The germanates are characterized by crystalline structures of a rather open nature.

A typical example of a doped germanate having luminescent characteristics is a crystal synthesized from a composition having the following starting weight percentages, 0.10 $Cr_2O_3$, 3.92 $Li_2O$, and 95.98 $GeO_2$. Rare earth dopant oxides of holmium, neodymium, erbium and ytterbium may be employed to advantage as well as chromium sesquioxide, all of which react with the germanates to produce fluorescence.

All of the doped germanates disclosed herein fluoresce in the visible spectrum or infrared as a result of the chemical reaction of the transition oxide and/or rare earth oxide dopants and the germanate compounds. The germanates disclosed here appear to be characterized by large, open structures (>1.04 A.). The germanates can be synthesized in the glassy state as well as in the single crystalline state having the same or nearly the same composition and concentration; i.e. $Li_2O\cdot7aqGeO_2$:Nd glass and $Li_2Ge_7O_{15}$:$Nd^{3+}$crystal.

As employed herein glasses are mixtures or solutions rather than exact chemical compounds. An identical composition and concentration is understood, therefore, to means that (1) constituents of the crystal and the glass are the same, and (2) the molar concentration of the constituents of the crystal and the molar concentration of one of the major chemical phases of the glass is the same or nearly the same in both solid states.

It should not be implied or inferred that the end product; e.g., the glass or single crystal will have the same atomic or molar concentration of atoms or ions as the starting mixture atomic or molar concentration of atoms or ions; however, in many cases, the concentrations of the starting mixture and the end product are the same; otherwise, new and/or different end products are synthesized. An example of an end product concentration ($Zn_1GeO_4$) different from the starting mixture concentration ($ZnGe_7O_{15}$) can be shown by chemical equation I.

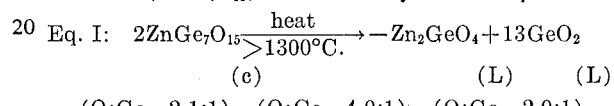

Eq. I:  $2ZnGe_7O_{15} \xrightarrow[>1300°C.]{heat} Zn_2GeO_4 + 13GeO_2$ (c)        (L)        (L)

(O:Ge=2.1:1)   (O:Ge=4.0:1)   (O:Ge=2.0:1)

Chemical equation II indicates that $Zn_1GeO_4$ can be synthesized as a crystalline compound.

Eq. II:

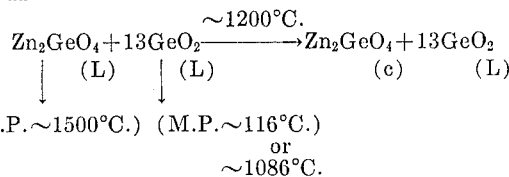

$Zn_2GeO_4 + 13GeO_2 \xrightarrow{\sim 1200°C.} Zn_2GeO_4 + 13GeO_2$ (L)        (L)        (c)        (L)

(M.P.~1500°C.)  (M.P.~116°C.)
or
~1086°C.

Chemical equation III indicates that $GeO_2$ can also be synthesized as a crystalline or glass compound.

Eq. III:

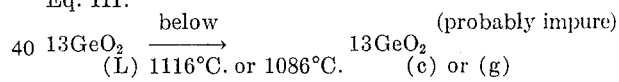

$13GeO_2 \xrightarrow[1116°C. \text{ or } 1086°C.]{below} 13GeO_2$ (probably impure)

(L)                               (c) or (g)

In the equations, L = liquid, c = crystalline and q = glass.

In equation I, $Zn_2GeO_4$ and $13GeO_2$ is a molten solution in which $GeO_2$ serves as the solvent for the solute $Zn_2GeO_4$ as well as a common ion compound. As indicated in equation II, $Zn_2GeO_4$ from solution by a method similar to or by the Czochralski crystal-pulling technique. The crystalline $Zn_2GeO_4$ can then be melted (>1500° C.) and quickly quenched to form a glass. In equation III, this reaction can occur below either 1116° C. or 1086° C. depending on the structure of the molten $GeO_2$, by slow cooling, pulling or quench methods.

The excess $GeO_2$ in molten solution can also serve as the solute if it is not the lowest melting point compound and thereby can be removed from solution by the Czochralski technique.

The impure $GeO_2$ can be converted from soluble $GeO_2$ to insoluble $GeO_2$ and vice versa under specific heat conditions with or without the use of flux systems.

Since impure $GeO_2$ can be synthesized by this process, $GeO_2$ is referred in this invention as a germanate. If this process is carried out under chemical reducing conditions, then GeO could be formed and thereby be termed a germanate.

The germanates of this invention have a wide variety of applications. One such application is as a primary component in a laser. The laser may be defined as a high-frequency oscillator and amplifying device which produces amplification by stimulated emission of radiant energy.

Several specific examples of germanate compounds which may be employed as lasers are $Li_2Ge_7O_{15}$:$Nd^{3+}$, $Li_2GE_4O_9$:$Cr^{3+}$, and $Na_4Ge_9O_{20}$:$Nd^{3+}$.

These germanates are new laser materials which as single crystals or glasses may be employed to advantage in a variety of applications such as optical radar and optical measuring instruments, biological applications, metalworking applications, as an energy source to initiate chemical reactions, as a means to ignite fuel-powered engines, as a light source or for various communications systems.

The open structures of the germanates can be multiple-doped with transition, rare earth, and nontransition oxides which can change both the temperature range and the wavelength of laser action. Also, the germanates can be customized by ion implantation doping to give a specific type of semiconductor.

The various kinds of luminescence of the germanate compounds makes possible a new pumping source for lasers. The pumping source may be defined as the "internal luminescent laser excitation mode" (Illem). One or more of the different types of luminescence may be employed such, for example, thermoluminescence, phosphorescence or cathodoluminescence. By way of example, thermoluminescence laser pumping can occur following the cooling of the germanate laser material under ultraviolet irradiation to 4.2° K. Such a laser is shown in FIG. 2 and is comprised of a germanate crystal 10, typically cylindrical in configuration, with silvered and semisilvered ends 12 and 14. Disposed about the crystal 10 are annular members 16, 18 and 20, the member 16 being a conventional flash lamp or other light source for use in conventional pumping of the crystal 10. The member 18 is a heating element used to heat the crystal 10 and the member 20 is a lamp adapted to emit ultraviolet light. The three members 16, 18 and 20 are separately connected to a pumping source, a heating source and an ultraviolet light source respectively. All three sources are operatively connected to a program control unit which actuates the several members in a predetermined fashion. The control unit is programmed to heat the laser material to a given temperature where its laser emission is most efficient (ca. 83° K.) and thermoluminescence occurs. At this temperature (83° K.) the crystal thermoluminescence for long periods of time (i.e. 5 minutes or more). This thermoluminescence can serve either as a pumping source for longer (infrared) wavelength lasers (e.g. using $Li_2Ge_7O_{15}$ doped with neodymium or erbium) or as a continuous laser-pumping source (CW) for lasers (e.g. $Li_2Ge_7O_{15}$ doped with chromium) which operate at the same wavelength as the thermoluminescence. The thermoluminescence wavelength can be changed by a chemical adjustment of the luminescent dopant. In some cases it may be necessary to use the conventional pumping source 16 intermittently in conjunction with the internal luminescent laser excitation mode.

Figure 1:
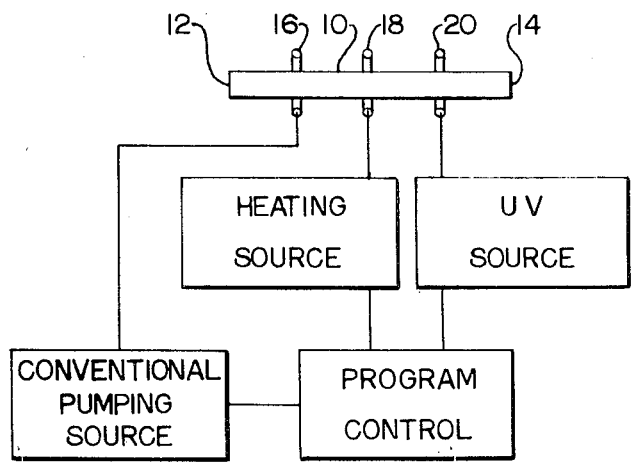
FIG. 1 is a schematic diagram of a laser-pumping source made according to the invention.

Polymorphic transformations occur in the germanates. A transition from a high-temperature form, which is of a centrosymmetric class, can be converted to a low-temperature form which is of a noncentrosymmetric class. The latter class (noncentrosymmetric) makes available a number of desirable properties such as piezoelectric, pyroelectric, ferroelectric and optical activity components. A typical application of a ferroelectric single crystal is shown in FIG. 1 where a germanate crystal 22 is mounted along the optical axis of a laser 24 to convert the output of the laser from one frequency to another. Typically, such a crystal can convert a 1.06-micron laser beam to a 0.53-micron laser beam.

Figure 3:
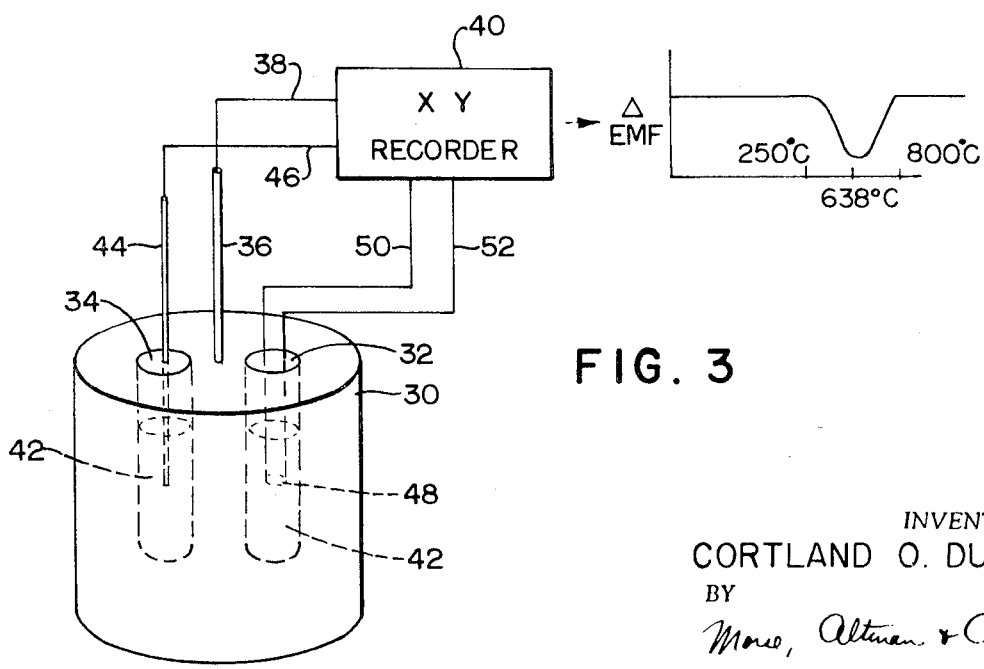
FIG. 3 is another schematic diagram showing a thermoelectric device made according to the invention, and, FIG. 4 is a thermogram displaying certain characteristics of the invention.

The germanates of this invention also display an unusual type of thermoelectricity whereby the compounds may be employed to advantage in thermoelectric devices, solid-state batteries, constant voltage sources and as refrigerating devices. In FIG. 3 there is shown a thermoelectric device made according to the invention. As shown, the device includes a sample holder 30 of electrically conductive material, typically an alloy of 90 percent platinum and 10 percent rhodium. The sample in the illustrated embodiment is in the form of a cylinder, typically three-fourths of an inch in diameter by 1 inch in length and formed with a pair of parallel longitudinal wells 32 and 34. Connected electrically to the center of the holder 30 is an electrode 36, preferably of the same material as the holder and connected by a lead 38 to an output such as an XY recorder 40. Disposed in each well is a germanate sample 42, typically $Li_2Ge_7O_{15}$. The sample is first melted and solidified so that there is a close fitting engagement with the electrodes of the well. Disposed in the sample 42 in well 34 parallel to the electrode 36 is another electrode 44 which extends up through the well 34, out of electrical contact with the sample holder 30 and connected by a lead 46 to the XY recorder 40. Both leads 38 and 46 are connected to the Y-axis of the recorder. In the well 42 a thermocouple 48 is disposed and is connected by leads 50 and 52 to the X-axis of the recorder. It will thus be understood that the Y-axis will plot voltage while the X-axis will plot temperature.

EXAMPLE OF THE TECHNIQUE

The sample holder 30 is uniformly heated beyond the melting point of $Li_2Ge_7O_{15}$ ($\approx$m.p. 1032) for example. The melt is solidified and the fused salt is cooled to a temperature below 200° C. The fused salt is then repeatedly heated below its melting point and cooled to 200° C. During each temperature cycle (heating and cooling) a potential (voltage) difference is highly reproducible between 250° C. and 800° C. The reproducible gaussian curve retraces in the same direction upon cooling as it traces upon heating; that is, the curve is unidirectional irrespective if the fused salt is being heated or cooled.

At the peak of the gaussian curve an electromotive force (EMF) of 120 millivolts (0.12 volts) and 100 millimicroamperes ($10^{-6}$ amps) for a 250-milligram sample has been measured.

If the temperature within the range (250° to 800°) is held constant, the EMF also is constant. The potential difference characteristic is highly stable between 250° C. to 800° C. so that the system may be employed as a constant-voltage source or as a low-power solid-state battery. The amplitude of the potential difference appears to be proportional to the mass of the sample so that the output may be increased by increasing the size of the germanate sample.

In addition to the foregoing applications the germanates may also be applied as temperature sensors, radiation detectors transducers, cathode ray image intensifiers, photosensitive and optical glasses, illumination and information display panels, as logic devices and applications similar to low-temperature quartz such as light polarizers and radio frequency control devices. Also the germanates may be used as synthetic gems in the jewel industry since the glasses and the single crystals have high indices of refraction (C.A. 1.735) and can be cut, polished and faceted. The germanates will also hold a charge for an extended period of time and as such may be employed as memory devices in a computer or for other applications where such a characteristic would be useful. By way of example, a sample of $Li_2Ge_7O_{15}$ doped with chromium was exposed to ultraviolet light at room temperature. This charged the sample and several days later the charge was released by heating the sample. This caused the sample to release the charge in the form of a light emission.

Listed below are some suggested uses of the germanates along with related characteristic properties applicable to the use.

| Use | Property |
| --- | --- |
| Laser | Fluorescence |
| Light Source | Phosphorescence, Electroluminescence |
| Information storage | Thermoluminescence (Prolonged charge storage) |
| Constant voltage source | Thermoelectricity |
| Ion Implantation (Semiconductors) | Open structure |
| Temperature detector | Thermoluminescence |
| Solid-State Battery | Thermoelectricity |
| Conversion of high to low temperature single crystal form | Polymorphism |
| Cathode ray tube coating | Cathodoluminescence |
| Narrow band pass filter | Unknown |
| Electro-optic | Ferroelectric |
| Single or multiple doping by large (1.04 A.) cations | Open structure |

Preferred photoluminescence     Crystallographic orientation

Having thus described the invention what I claim and desire to obtain by Letters Patent of the United States is:

1. A solid-state article obtained by the solidification of a composition essentially comprised of germanium oxide and at least one substance selected from a class which when combined with said germanium oxide produces a germanate having the concentration ratio limits of oxygen to germanium ranging from 1.5:1 through 3.0:1, said germanate being doped with a transition oxide or a rare earth oxide, and power means for exciting said article to laser action by causing a chemical reaction between the germinate and the dopant.

2. The solid-state article of claim 1 wherein said class consists of lithium, sodium and zinc.

3. A solid-state article according to claim 2 wherein said germanate is chemically combined with at least one substance selected from the class consisting of halides.

4. The solid-state article of claim 1 wherein said germanate is an oxide composition selected from the group consisting of $Li_2GE_7O$, $LI_2Ge_4O_9$, $Li_4Ge_9O_{20}$, $Li_2GeO_3$, $Na_4Ge_9O_{20}$, $Na_2GeO_3$, $Zn_2Ge_3O_8$, $ZnGe_7O_{15}$, $Na_2GeO_2$, $ZnGe_4O_9$ and $Li_2Ge_2O$.

5. The solid-state article of claim 1 wherein said starting mixture is a multiconstituent compound selected from the group consisting of $Li_2Al_{0.67}Ge_7O_{16}$, $Na_2Al_2Ge_4O_{11}$, and $SrCoZn_2O_{12}$.

6. The solid-state article of claim 1 including resonance means operatively associated with said article for sustaining oscillations thereof.

7. The solid-state article of claim 1 including light means for charging said article and heating means for heating said article to discharge said article.

8. A solid-state article of claim 1 wherein said germanate is characterized by an open crystalline structure.

9. The solid-state article according to claim 1 wherein said germanate is selected from the group consisting of $Li_2GeO_3$, $Na_2GeO_2$, $Li_2Ge_7O_{15}$, $ZnGe_4O_9$, $Zn_2Ge_3O_8$, $Na_2GeO_3$, $Li_2Ge_4O_9$, $Li_4Ge_9O_{20}$, $Li_2GeO_3$, $Na_4Ge_9O_{20}$, $ZnGe_7O_{15}$, $Li_2A_{0.67}Ge_7O_{16}$, $Na_2A_2Geb4O_{12}$, and $SRCoZn_2Ge_4O_{12}$.

10. The solid-state article according to claim 1 wherein said germanate is further doped with at least one substance selected from the group consisting of transition metals and rare earth metals.

* * * * *

UNITED STATES PATENT OFFICE
CERTIFICATE OF CORRECTION

Patent No. 3,624,547  Dated November 30, 1971

Inventor(s) Cortland O. Dugger

It is certified that error appears in the above-identified patent and that said Letters Patent are hereby corrected as shown below:

Title page, item [54] in the title, "germinate" should be spelle --germanate-- same page, in the abstract, lines 1, 4, 5 and 6 "germinates" should be spelled --germanates-- in the abstract, line 3, "germinate" should be spelled --germanate--

Column 1, line 2 of the title, "germinate" should be spelled --germanate--

Column 3, line 2, "Ygaxis" should read -- Y-axis--

Line 32 should read
--(a) $Li_2Ge_2O_3$  O:Ge=1.5:1 because 3.0/2Ge=1.5--

Line 35 should read
--(d) $Zn Ge_4 O_9$  O:Ge=2.3:1--

Line 37 should read
--(e) $Zn_2 Ge_3 O_8$  O:Ge=2.7:1--

Line 38 should read
--(f) $Na_2 Ge O_3$  O:Ge=3.0:1--

Column 4, line 2, "$Li_2O.7$ aq Ge $O_2$:Nd" should read

--$Li_2 O \cdot 7$ Ge $O_2$:Nd --

Line 17 "($Zn_1 Ge O_4$)" should read--($Zn_2 Ge O_4$)--

Line 25 "$Zn_1 Ge O_4$" should read--$Zn_2 Ge O_4$--

Line 42 "q= glass" should read--g= glass--

UNITED STATES PATENT OFFICE
CERTIFICATE OF CORRECTION

Patent No. 3,624,547            Dated November 30, 1971

Inventor(s) Cortland O. Dugger           PAGE - 2

It is certified that error appears in the above-identified patent and that said Letters Patent are hereby corrected as shown below:

Column 7, Claim 1, last line, "germinate" should be spelled --germanate--

Claim 3, last line should read --selected from the class consisting of halides, and oxides.--

Claim 4 third line, "$Li_2GE_7O$" should read --$Li_2Ge_7O_{15}$-- same line, "$LI_2Ge_4O_9$" should read --$Li_2Ge_4O_9$--

Column 8, Claim 4, last line, "$Li_2Ge_2O$" should read --$Li_2Ge_2O_3$--

Claim 9, last line, "$Na_2A_2Geb4\ O_{12}$" should read --$Na_2Al_2Ge_4O_{12}$--

Signed and sealed this 18th day of July 1972.

(SEAL)
Attest:

EDWARD M. FLETCHER, JR.          ROBERT GOTTSCHALK
Attesting Officer               Commissioner of Patents